H. M. PLAISTED.
TRACTION WHEEL.
APPLICATION FILED APR. 28, 1920.
1,368,049.
Patented Feb. 8, 1921.
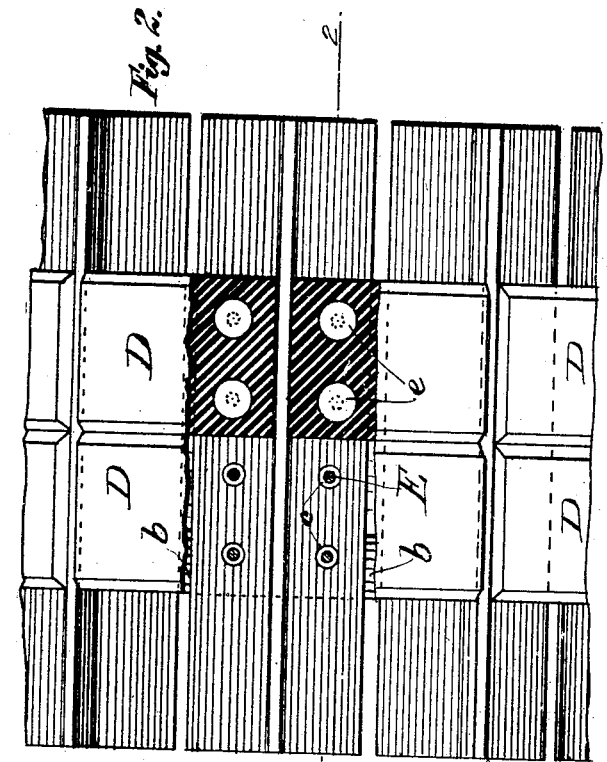
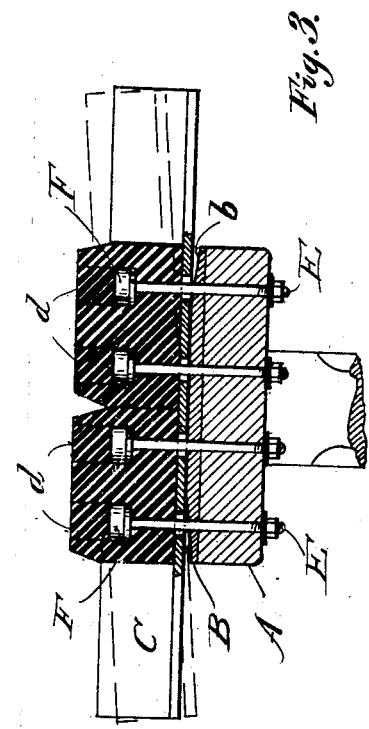
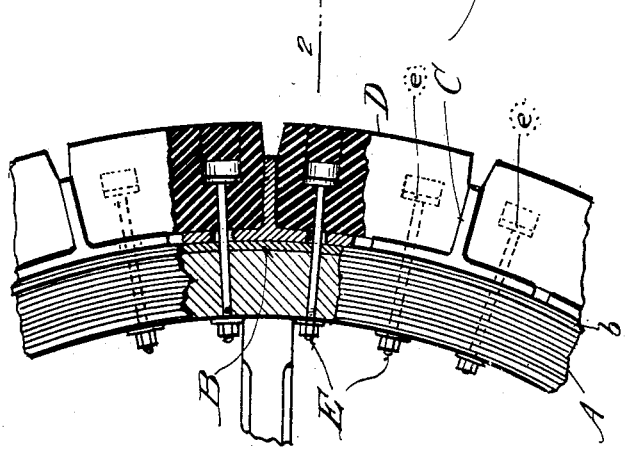
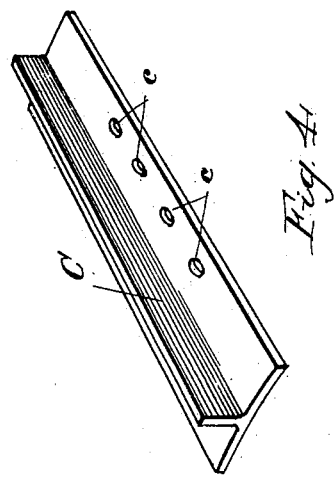
INVENTOR.
Harold M. Plaisted

UNITED STATES PATENT OFFICE.

HAROLD M. PLAISTED, OF ST. LOUIS, MISSOURI, ASSIGNOR OF FORTY-NINE ONE-HUNDREDTHS TO MILTON F. WILLIAMS, OF ST. LOUIS, MISSOURI.

TRACTION-WHEEL.

1,368,049.

Specification of Letters Patent. Patented Feb. 8, 1921.

Application filed April 28, 1920. Serial No. 377,322.

*To all whom it may concern:*

Be it known that I, HAROLD M. PLAISTED, a citizen of the United States, residing at St. Louis, State of Missouri, have invented certain new and useful Improvements in Traction-Wheels, of which the following is a specification.

This invention relates to certain new and useful improvements in traction wheels, the peculiarities of which will be hereinafter described and claimed:

The main object of my invention is to provide means for automatically widening the normal tread of a traction wheel when passing over soft ground, by an auxiliary bearing surface that is normally inoperative. Also to increase automatically the gripping surfaces when traveling over soft ground, so as to spread out the tractive effort and avoid rotation without translation.

Also to provide such flexibility of the auxiliary tread that it will accommodate itself to uneven ground, such as corn fields or plowed ground.

In the accompanying drawing on which like reference letters indicate corresponding parts, Figure 1 represents part of a wheel embodying my invention, in partial section; Fig. 2 a face view and partial section; Fig. 3, a radial section of the same, on the line 2—2 of Fig. 2; and Fig. 4, a detail perspective view of the preferred form of a tread-widening piece adapted to form an auxiliary tread. The drawing shows a two-part rim, composed of a wooden rim A with metal band B, preferably beveled inward from each edge at *b* to reduce the width of band that is normally in contact with tread-widening pieces C that are longer than the width of said rim, and therefore project axially at each side as indicated in Figs. 2 and 3. These pieces C are preferably T-section, and the double flange head engages with the outside of said band B, while the leg of said T is preferably radially located between resilient blocks D mounted outside the head flange, and forming the normal tread of said wheel. The length of said leg flange is preferably less than the radial thickness of said blocks, so that when the block tread operates on hard surfaces pavement for instance, the leg flange will not contact with the pavement. The resilient tread only bears on street pavement or other hard smooth surface. When the wheel runs into soft ground however, the weight on the wheel forces the blocks and radial flanges of said auxiliary tread downward till the flanges next to the rim meet the ground and form a bearing that may be twice or more the area of the normal tread; and this increased bearing surface tends to prevent further sinking. This auxiliary tread giving increase of bearing and gripping surface, is automatically operative when soft ground is reached and such auxiliary surfaces are needed, but is inoperative on a smooth, hard surface like city pavement, where the cushioning effect of a resilient tire is desirable. This auxiliary tread is always in place, ready to be used instantly when occasion demands more bearing and gripping surfaces, and passes out of use when not needed.

Any suitable fastening means for the blocks, band and rim may be employed, such as four bolts with large flat heads *e* each engaging the bottom of a pocket F extending approximately half the radial thickness of the blocks from the outside, and preferably closed by a plug *d* cemented into said pocket for (say) two thirds of its depth, leaving the balance of the pocket F for play or clearance above the bolt head, so that compression of the rubber blocks will not cause the bolts to move inward.

The shank of each bolt passes snugly through a matching hole in the inner half of the resilient block at each corner, then loosely through a clearance hole *c* in the head flange of the piece C, and then snugly through matching holes in the band B and rim A. A nut and washer on the inner end of each bolt, gives a compressively yielding stress on the part of the rubber block under the head, and likewise on the flange interposed between said block and band. A pressure inward on one end of the piece C as when passing over uneven ground will cause the other end to rock outward as indicated by dashed lines in Fig. 3. This rocking or oscillating movement of the auxiliary tread is facilitated by the bevels *b* before mentioned, as the fulcrum points are thereby brought nearer the central plane of the wheel.

I claim:

1. A wheel of the character described, comprising a rim, resilient blocks forming the normal tread, tread-widening pieces longer than the width of the normal tread and each having a radial, gripping flange located between said blocks, and having also a bearing flange located between said rim and said blocks, and fastening means for said blocks and tread-widening pieces, substantially as described.

2. A wheel of the character described, comprising a rim having a larger diameter at its middle than at its edges, tread-widening pieces mounted on the outside of said rim, resilient blocks mounted outside said pieces, and fastening means between said blocks and said rim and passing loosely through said pieces and forming a cushioned connection between said pieces and said rim allowing oscillation, substantially as described.

3. A wheel of the character described comprising a rim, resilient blocks forming the normal tread, tread-widening pieces each longer than the width of the normal tread and having a double flange located between the rim and said blocks forming auxiliary bearing surfaces and having also a leg flange located between said blocks and of lesser radial length than the radial thickness of the blocks forming auxiliary gripping surfaces, and fastening means, substantially as described.

4. A wheel of the character described comprising a rim having lesser diameter at its edges than at its center, a series of cross pieces having flanges and mounted on said rim and extending laterally beyond the rim, a series of resilient blocks having pockets and mounted on the flanges of said cross pieces, and bolts having heads located in said pockets and passing through said flanges and rim and detachably securing to the rim, the said blocks and cross pieces so as to allow oscillation of the latter, substantially as described.

5. A wheel of the character described, comprising a beveled rim, cross pieces mounted on said rim, a resilient tread on said cross pieces, and having pockets open to the outside, plugs for said pockets forming inclosed chambers, and bolts having heads located at the inner ends of said chambers, and passing through said cross pieces and rim and securing the cross pieces on said rim.

6. A wheel of the character described, comprising a beveled rim with holes across the face, a series of cross pieces having flanges and mounted on said rim, and having a series of holes in said flanges across the face of the rim, a resilient tread having pockets and holes matching the holes in said tread and cross pieces, and bolts located in said matching holes and compressibly holding said tread and cross pieces to the center of said rim, and so holding the same to the edges of said rim as to allow oscillation of the cross pieces, substantially as described.

In testimony whereof I have affixed my signature.

HAROLD M. PLAISTED.